United States Patent [19]

Tani et al.

[11] Patent Number: 4,925,815

[45] Date of Patent: May 15, 1990

[54] SILICON CARBIDE COMPOSITE CERAMIC

[75] Inventors: Toshihiko Tani, Aichi; Shigetaka Wada, Mie, both of Japan

[73] Assignee: Kabushiki Kaisha Toyota Chuo Kenkyusho, Aichi, Japan

[21] Appl. No.: 310,469

[22] Filed: Feb. 15, 1989

Related U.S. Application Data

[63] Continuation of Ser. No. 84,164, Aug. 11, 1987, abandoned.

[30] Foreign Application Priority Data

Sep. 3, 1986 [JP] Japan ................................ 61-207004

[51] Int. Cl.$^5$ ........................ C04B 35/54; C04B 35/56
[52] U.S. Cl. ........................................ 501/90; 501/95; 501/99
[58] Field of Search ................................ 501/90, 95, 99

[56] References Cited

U.S. PATENT DOCUMENTS 3,966,855  6/1976  Hollenberg ........................... 501/88
4,642,271  2/1987  Rice ..................................... 501/95

OTHER PUBLICATIONS

"Carbon Fibre", (and English translation of pp. 232–234).

Primary Examiner—Mark L. Bell
Attorney, Agent, or Firm—Oblon, Spivak, McClelland, Maier & Neustadt

[57] ABSTRACT

A high-toughness silicon carbide composite ceramic comprising silicon carbide, 5 to 50 vol % of graphite whiskers, and sintering aid, and a method for producing the composite ceramic. The composite ceramic has high-temperature strength and fracture toughness value, and also has electrical conductivity.

3 Claims, No Drawings

SILICON CARBIDE COMPOSITE CERAMIC

This application is a continuation of application Ser. No. 07/084,164 filed on Aug. 11, 1987, now abandoned.

BACKGROUND OF THE INVENTION

1. Field of the Invention

The present invention relates to a high-toughness silicon carbide composite ceramic which is capable of being machined by electrical discharge, and which is applicable to products such as engine parts of a gas turbine and rotor parts of a turbo-charger that are required ±o have a resistance to high temperature at a temperature of not lower than 1,400° C.

2. Description of the Related Art

A silicon carbide (hereinunder referred to as "SiC") material has a higher resistance to high temperature than a silicon nitride material and, in particular, in an SiC material with a sintering aid except oxides, such as boron carbide and aluminum nitride, added thereto, the strength is not lowered even at a temperature not lower than 1,500° C. On the other hand, the most serious weak point of an SiC material is that the fracture toughness value and the resistance to mechanical shock are low. An SiC material ordinarily has a $K_{IC}$ value, which represents a fracture toughness, of 2 to 4 MPa·m$^{\frac{1}{2}}$, which is about half that of a silicon nitride material, namely, 5 to 7 MPa·m$^{\frac{1}{2}}$. Therefore, a turbine rotor manufactured from an SiC material involves the fatal defect that a blade is apt to be broken by foreign particles which are flown thereto.

On the other hand, in order to enhance the toughness of a ceramic material, an attempt has been made to add SiC whiskers thereto as a reinforcing material. For example, an SiC whisker reinforced alumina composite ceramic was manufactured by Wei et al [G. C. Wei and P. F. Becher, Am. Ceram. Soc. Bull., 64, No. 2, pp 298 to 304 (1985)], and an SiC whisker reinforced silicon nitride composite ceramic was manufactured by Ueno et al [Kazuo Ueno and Yasuo Toibata, J. Ceram. Soc. Japan, 91, No. 11, pp 491 to 497 (1983)]. These ceramic materials obtained higher fracture toughness values than those without whiskers.

However, although these composite ceramic materials have improved fracture toughness values, they have restrictions in the high-temperature resistance as a matrix material, and insufficient in the high-temperature strength at a temperature of not lower than 1,400° C, which is aimed at by the present invention.

SUMMARY OF THE INVENTION

Accordingly, it is an object of the present invention to provide an SiC composite ceramic which has high high-temperature strength and fracture toughness value, and which also has electrical conductivity.

To achieve this aim, a composite ceramic according to the present invention comprises SiC, 5 to 50 vol% graphite whiskers, and sintering aid.

The graphite whiskers to be added to SiC as a reinforcing material preferably has a diameter of 0.02 to 2 μm. If the diameter is less than 0.02 μm, the effect of addition is indiscernible and the fracture toughness value is scarcely improved. On the other hand, if the diameter exceeds 2 μm, the graphite whiskers act as a defect of that size in SiC, thereby lowering the strength. The ratio of the length and the diameter is preferably not less than 5. If it is less than 5, the nature as a powder becomes strong, which makes it difficult to bring about an effect of a whisker. It is advantageous in terms of the improvement of the toughness that a graphite whisker has a configuration as close as to a linear configuration. The composite ceramic of the present invention contains preferably 5 to 50% of graphite whiskers in a volume ratio. If the graphite whisker content is less than 5%, there is no effect of improving the fracture toughness, while if it exceeds 50%, the densification of the composite becomes difficult, thereby greatly lowering the strength.

The sintering aid to be added to SiC in order to accelerate sintering is an aid which is generally used as a sintering aid of SiC, for example, boron, a boron compound, aluminum, an aluminum compound, or a rare earth oxide. As the boron compound, boron carbide ($B_4C$), boron nitride (BN), boron phosphate (BP), etc. are usable. As the aluminum compound, aluminum oxide ($Al_2O_3$), aluminum nitride (AlN), aluminum carbide ($Al_4C_3$), etc. are usable. The rare earth oxide is exemplified by $Y_2O_3$, but it brings about no effect in a single form and is effective only when it is used in combination with $Al_2O_3$ or $MgAl_2O_4$. The amount of sintering auxiliary to be added is preferably 0.1 to 5 parts by weight in the case of boron or a boron compound, 1 to 20 parts by weight in the case of aluminum or an aluminum compound, and 1 to 20 parts by weight in the case of a rare earth compound, respectively, on the basis of 100 parts by weight of silicon carbide. These sintering auxiliaries may be used in the form of a mixture of two or more kinds. In the case of adopting a pressureless sintering method, both a substance which becomes a boron source, e.g., boron, BN and $B_4C$, and a substance which becomes a carbon source, e.g., carbon black and a phenolic resin are ordinarily added. It is desirable that 0.2 to 5 parts by weight of a substance which becomes a boron source and 0.5 to 3 parts by weight of a substance which becomes a carbon source in terms of a residue after thermal decomposition are added on the basis of 100 parts by weight of silicon carbide.

SiC may be of either α type or β type. The average particle diameter of SiC is preferably not more than 5 μm. If it exceeds 5 μm, the strength is lowered. Silicon carbide is the main constituent of a composite ceramic of the present invention, and after a predetermined amount of sintering aid is added thereto, graphite whiskers are mixed with the mixture powder in the above-described volume ratio.

A graphite whisker reinforced silicon carbide composite ceramic of the present invention is manufactured by a method comprising the steps of mixing graphite whiskers, a sintering aid and silicon carbide, and sintering the mixture powder. Both steps may be carried out by an ordinary method used in the manufacture of ceramics.

The three raw materials are ordinarily mixed by wet blending, and it is preferable that the graphite whiskers are thoroughly dispersed in advance in an organic solvent such as ethyl alcohol by the application of ultrasonic waves, mechanical agitation, addition of a surfactant or the like, to remove the aggregates. A method of uniformly dispersing the graphite whiskers by adding ar organic binder thereto and kneading the mixture may be adopted, as occasion demands.

After the mixture powder is dried, it is sintered by a hot pressing method, pressureless sintering method, hot isostatic pressing method (HIP) or the like in the form of the powder itself or a molded form obtained by using a mold or the like. The hot pressing is carried out at a temperature of 1,800° to 2,300° C. and under a pressure of not less than 10 MPa. At a temperature below 1,800° C., it is impossible to obtain a sufficiently dense hot pressed body, while a temperature exceeding 2,300° C. is unfavorable because it starts the thermal decomposition of silicon carbide itself. A non-oxidizing atmosphere such as Ar, $N_2$ and $H_2$ atmospheres is the most preferable, but even by an ordinary hot pressing conducted without any special gases as mentioned above it is possible to obtain a good composite ceramic because the reaction between the carbon embedding powder and air forms a $CO+N_2$ atmosphere having a reducing effect, thereby preventing the graphite whiskers from being damaged.

If the graphite whisker content is not more than 10 vol%, the hot pressing method may not necessarily be adopted, and it is possible to obtain a dense and high-toughness sintered body by a pressureless sintering method, namely, by sintering a molded body at a temperature of 1,800° to 2,300° C. in a non-oxidizing atmosphere under normal pressure.

In the case of adopting a HIP (hot isostatic pressing) method, the mixture powder with an organic binder, etc. added thereto, if necessary, is molded into a desired configuration by molding, rubber pressing, extrusion molding, injection molding, or the like. Alternatively, the powder is made into a slurry, which is cast and dried by a slip casting method to obtain a desired configuration. The molded form is degreased, encapsuled into a glass capsule or a glass bath, and subjected to what is called "direct HIP" to obtain a dense, high-strength and high-toughness composite material. The HIP conditions are preferably that the temperature is 1,700° to 2,200° C. and a pressure is not less than 50 MPa. It is also possible to obtain a dense, high-strength and high-toughness composite ceramic by adopting what is called "post HIP" in which the molded material is baked at 1,800° to 2,300° C. and thereafter subjected to a HIP treatment at a temperature of 1,700° to 1,900° C. and under a pressure of not less than 50 MPa.

In the present invention, SiC is reinforced by graphite whiskers, so that when a cracking proceeds, the whiskers produce a crack deflection, crack branching and pullout from the matrix, which increase the fracture energy and, as a result, a high fracture toughness value is obtained. A ceramic of the present invention has a $K_{IC}$ value of 4 to 8 MPa·m$^{\frac{1}{2}}$ while the $K_{IC}$ of ordinary SiC is about 2 to 4 MPa·m$^{\frac{1}{2}}$. The present invention has two other advantages in addition to the above-described chief advantage. One is that it is possible to prevent the exaggerated grain growth (growth of giant plate crystals), which are ordinarily generated at a baking temperature of not lower than 2,100° C., and the lowering of the strength caused thereby. Graphite whisker added silicon carbide ($B_4C$ is added as a sintering auxiliary) consists of particles of not greater than 10 μm, even if it has been hot pressed at as high a temperature as 2,150° C., and maintains a bending strength of not less than 400 MPa.

Since a conventional SiC sintered body is hard and brittle, it is difficult to machine. In addition, since the resistivity thereof is not less than $10^3$ Ω·cm, it is impossible to machine a conventional SiC sintered body by electrical discharge. In contrast, a ceramic of the present invention, which has graphite whiskers added to SiC has a greatly lowered resistivity, thereby enabling electrical discharge machining, and it is therefore possible to produce a part of a desired configuration from the sintered body. This is the other advantage.

DESCRIPTION OF THE PREFERRED EMBODIMENTS

The present invention will be explained in more detail with reference to the following examples.

EXAMPLE 1

To β-SiC having an average particle diameter of 0.27 μm was added 3 wt% of boron carbide having an average particle diameter of 0.63 μm as a sintering aid to make an easily sinterable SiC powder mixture. Graphite whiskers 0.1 to 1 μm in diameter and 5 to 100 μm in length were mixed with the easily sinterable SiC powder in volume ratios of 10 : 90, 20 : 80, 30 : 70, 40 : 60, and 50 : 50, respectively. Ethyl alcohol was added to the respective mixtures and the graphite whiskers were uniformly dispersed by mixing.

Each mixture was next dried in a constant temperature oven having a temperature maintained at 100° C. The thus-formed mixture was hot-pressed at a temperature of 2,150° C. and under a pressure of 25 MPa for 1 hour in an Ar atmosphere to obtain a graphite whisker reinforced SiC composite ceramic. Table 1 shows the results of examinations on the relative density, four-point bending strength both at room temperature and 1,400° C., $K_{IC}$ value and resistivity of each composite ceramic obtained in this way. The relative density was obtained by the Archimedes method, the four-point bending strength was obtained in accordance with JIS R 1601, and $K_{IC}$ value was obtained by an IM (indentation microfracture) method.

The $K_{IC}$ value of the SiC with no graphite whiskers added (No. Cl) was 2.7 MPa·m$^{\frac{1}{2}}$ and, in contrast, when 10 vol% of graphite whiskers were added (No. 1), the $K_{IC}$ value greatly increased to 4.1 MPa·m$^{\frac{1}{2}}$. The $K_{IC}$ value increased with the increase in the amount of added graphite whiskers until the amount reached 50 vol%. The four-point bending strength also increased with the addition of graphite whiskers, and all the composite ceramics in Nos. 1 to 5 exhibited a higher strength at 1,400° C. than at room temperature. When the amount of added graphite reached 60 vol% (No. C2), however, the density became as low as 92.0% and the four-point bending strength was lowered than that of the composite ceramic with no graphite whiskers added.

The resistivity of the SiC with no graphite whiskers added (No. Cl) was $2 \times 10^5$ Ω·cm and electrical discharge machining was impossible. On the other hand, when not less than 10 vol% of graphite whiskers were added, the resistivity became not more than 1 Ω·cm, and electrical discharge machining was possible. Especially, the sintered bodies having not less than 20 vol% of added graphite whiskers had a resistivity of not more than 0.1 Ω·cm, and even a hot pressed body of 3 mm thick was capable of being cut by electrical discharge.

EXAMPLE 2

In order to examine the effect of various sintering aids, the sintering aids having a particle diameter of not more than 1 μm shown in Table 2 were added to both β-SiC having an average particle diameter of 0.27 μm with 30 vol % of graphite whiskers 0.1 to 1 μm in diameter and 5 to 100 μm in length added thereto and β-SiC having an average particle diameter of 0.27 μm with no graphite whiskers added. Those mixtures were hot pressed at a temperature shown in Table 2 under 25 MPa in an Ar atmosphere for 1 hour. The amounts of added sintering aid were 3 parts by weight in the case of B or BN, 5 parts by weight in the case of AlN, $Al_2O_3$, or $Al_4C_3$, 3 parts by weight in the case of $Al_2O_3+Y_2O_3$ (3 parts each), and 3 parts by weight in the case of $MgAl_2O_4+Y_2O_3$ (3 parts each), respectively, on the basis of 100 parts by weight of β-SiC.

As is obvious from Table 2, addition of graphite whiskers increased both the four-point strength and $K_{IC}$ value in each sample. Any of the samples had a resistivity not more than 1 Ω·cm and enabled electrical discharge machining.

EXAMPLE 3

To β-SiC having an average particle diameter of 0.27μm were added 0.5 wt% of $B_4C$ having an average particle diameter of 0.63 μm and 1.5 wt% of carbon black having an average particle diameter of 0.02 μm to make an easy sinterable SiC powder mixture. Graphite whiskers 0.1 to 1 μm in diameter and 5 to 100 μm in length were mixed with easily sinterable SiC powder in a volume ratio of 5 : 95. The mixture material was molded under a pressure of 30 MPa, and thereafter formed at a hydrostatic pressure of 300 MPa. After the formed body was heated to 1,600° C. in vacuum, Ar was introduced into a furnace and the formed body was subjected to pressureless sintering at 2,100° C. for 1 hour.

The sintered body had the characteristics shown in Table 3. The strength was about the same as the sample which had no graphite whiskers added, but the $K_{IC}$ value was increased to 1.5 times that of the sample having no graphite whiskers. The resistivity was not more than 1 Ω·cm in both samples, thereby enabling electrical discharge machining.

EXAMPLE 4

To β-SiC having an average particle diameter of 0.27μm and containing 3 wt% of $B_4C$ having an average particle diameter of 0.63 μm was added 30 vol% of graphite whiskers 0.1 to 1 μm in diameter and 5 to 100 μm in length. After wet blending, the mixture was dried and molded under a pressure of 30 MPa. The molded body was encapsuled into a glass capsule in vacuo, and subjected to a HIP treatment at a temperature of 1,900° C. and under a pressure of 200 MPa for 1 hour. Thus, a high-toughness composite ceramic having a density of 100%, a four-point bending strength of 68 kgf/mm² at 1,400° C., and a $K_{IC}$ value of 6.6 MPa·m$^{\frac{1}{2}}$ was obtained. The resistivity was not more than 1 Ω·cm and electrical discharge machining was possible.

TABLE 1

| Sample No. | | Amount of Added Whiskers (vol %) | Relative Density (%) | 4-point Bending Strength (kgf/mm²) | | $K_{IC}$ (MPa · m$^{\frac{1}{2}}$) | Resistivity (Ω· cm) |
|---|---|---|---|---|---|---|---|
| | | | | Room Temp. | 1,400° C. (In Vacuum) | | |
| Comp. | C1 | 0 | 100 | 36 | 45 | 2.7 | $2 \times 10^5$ |
| Ex. | 1 | 10 | 100 | 42 | 46 | 4.1 | $9 \times 10^{-1}$ |
| | 2 | 20 | 99.8 | 62 | 65 | 5.3 | $8 \times 10^{-2}$ |
| | 3 | 30 | 99.6 | 52 | 58 | 5.8 | $4 \times 10^{-2}$ |
| | 4 | 40 | 99.2 | 50 | 56 | 6.8 | $2 \times 10^{-2}$ |
| | 5 | 50 | 98.5 | 46 | 50 | 7.2 | $8 \times 10^{-3}$ |
| Comp. | C2 | 60 | 92.0 | 28 | 30 | 6.0 | $3 \times 10^{-2}$ |

TABLE 3

| | Sample No. | Amount of Added Whiskers (vol %) | Relative Density (%) | 4-point Bending Strength (kgf/mm²) | | $K_{IC}$ (MPa · m$^{\frac{1}{2}}$) |
|---|---|---|---|---|---|---|
| | | | | Room Temp. | 1,400° C. (In Vacuum) | |
| Comparative Example | C10 | 0 | 98.0 | 48 | 52 | 2.8 |
| Example | 13 | 5 | 97.6 | 49 | 54 | 4.2 |

TABLE 2

| | Sample No. | Sintering Aid | Amount of Added Whiskers (vol %) | Hot Pressing Temperature (°C.) | Relative Density (%) | 4-point Bending Strength (kgf/mm²) | | $K_{IC}$ (MPa · m$^{\frac{1}{2}}$) |
|---|---|---|---|---|---|---|---|---|
| | | | | | | Room Temp. | 1,400° C. (In Vacuum) | |
| Comp. | C3 | B | 0 | 2,150 | 100 | 40 | 45 | 2.8 |
| | C4 | BN | 0 | 2,150 | 98.5 | 33 | 38 | 2.8 |
| | C5 | AlN | 0 | 2,150 | 100 | 62 | 62 | 3.0 |
| | C6 | $Al_2O_3$ | 0 | 2,150 | 100 | 60 | 28 | 4.0 |
| | C7 | $Al_4C_3$ | 0 | 2,150 | 99.2 | 43 | 40 | 3.5 |
| | C8 | $Al_2O_3 + Y_2O_3$ | 0 | 2,100 | 98.0 | 48 | 25 | 4.1 |
| | C9 | $MgAl_2O_4 + Y_2O_3$ | 0 | 2,000 | 97.4 | 41 | 17 | 4.4 |
| Ex. | 6 | B | 30 | 2,150 | 100 | 56 | 65 | 5.6 |
| | 7 | BN | 30 | 2,150 | 98.0 | 47 | 51 | 5.7 |
| | 8 | AlN | 30 | 2,150 | 99.4 | 74 | 75 | 6.5 |
| | 9 | $Al_2O_3$ | 30 | 2,150 | 99.6 | 70 | 56 | 6.8 |
| | 10 | $Al_4C_3$ | 30 | 2,150 | 98.8 | 50 | 50 | 5.1 |
| | 11 | $Al_2O_3 + Y_2O_3$ | 30 | 2,100 | 97.0 | 54 | 46 | 5.5 |
| | 12 | $MgAl_2O_4 + Y_2O_3$ | 30 | 2,000 | 97.2 | 49 | 30 | 5.8 |

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A high-toughness silicon carbide composite ceramic consisting essentially of silicon carbide, about 20 to 30 vol.% of graphite whiskers, and a sintering aid, wherein said graphite whiskers have a diameter of about 0.02 to 2 μm, the length of said graphite whiskers is within the range of 5 to 100 μm, and the ratio of the length to the diameter of said graphite whisker is not less than 5.

2. The high-toughness silicon carbide composite ceramic according to claim 1, wherein said silicon carbide has an average particle diameter not more than 5 μm.

3. The high-toughness silicon carbide composite ceramic according to claim 4, wherein said silicon carbide composite ceramic has a resistivity not more than 1 Ω·cm so as to enable electrical discharge machining.

* * * * *